Figure 1:
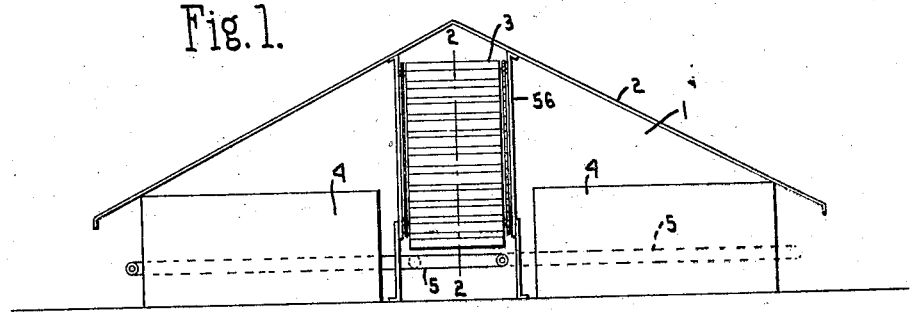

Feb. 22, 1927.
L. L. DENISON ET AL
1,618,582
APPARATUS FOR PRODUCING BRICK
Filed April 6, 1923
6 Sheets-Sheet 1

INVENTORS.
Leonard L. Denison
George W. Denison
BY
Ray Oberlin & Ray
ATTORNEYS.

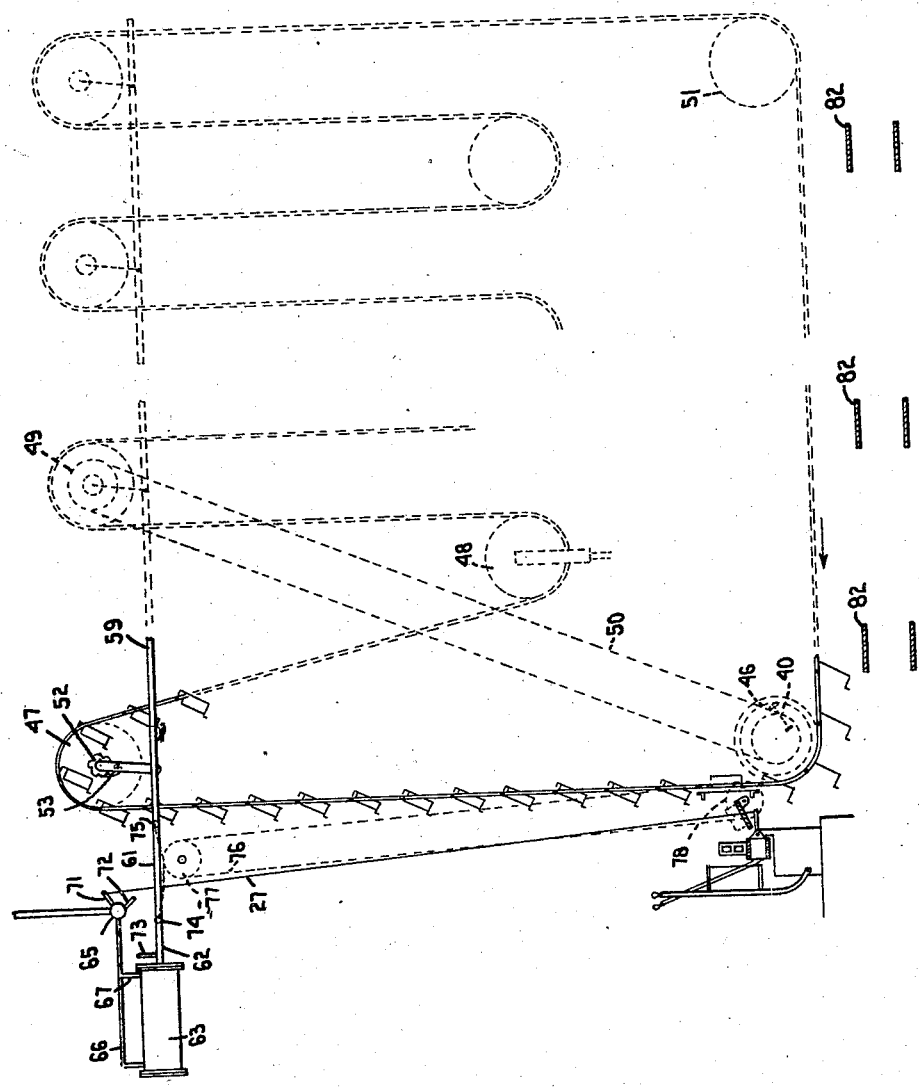

Feb. 22, 1927.   1,618,582
L. L. DENISON ET AL
APPARATUS FOR PRODUCING BRICK
Filed April 6, 1923   6 Sheets-Sheet 3

INVENTORS.
Leonard L. Denison
George W. Denison
BY
Ray Oberlin + Ray
ATTORNEYS.

Feb. 22, 1927.  1,618,582
L. L. DENISON ET AL
APPARATUS FOR PRODUCING BRICK
Filed April 6, 1923   6 Sheets-Sheet 4

INVENTORS.
Leonard L. Denison
George W. Denison
BY
ATTORNEYS.

Feb. 22, 1927. 1,618,582
L. L. DENISON ET AL
APPARATUS FOR PRODUCING BRICK
Filed April 6, 1923   6 Sheets-Sheet 5
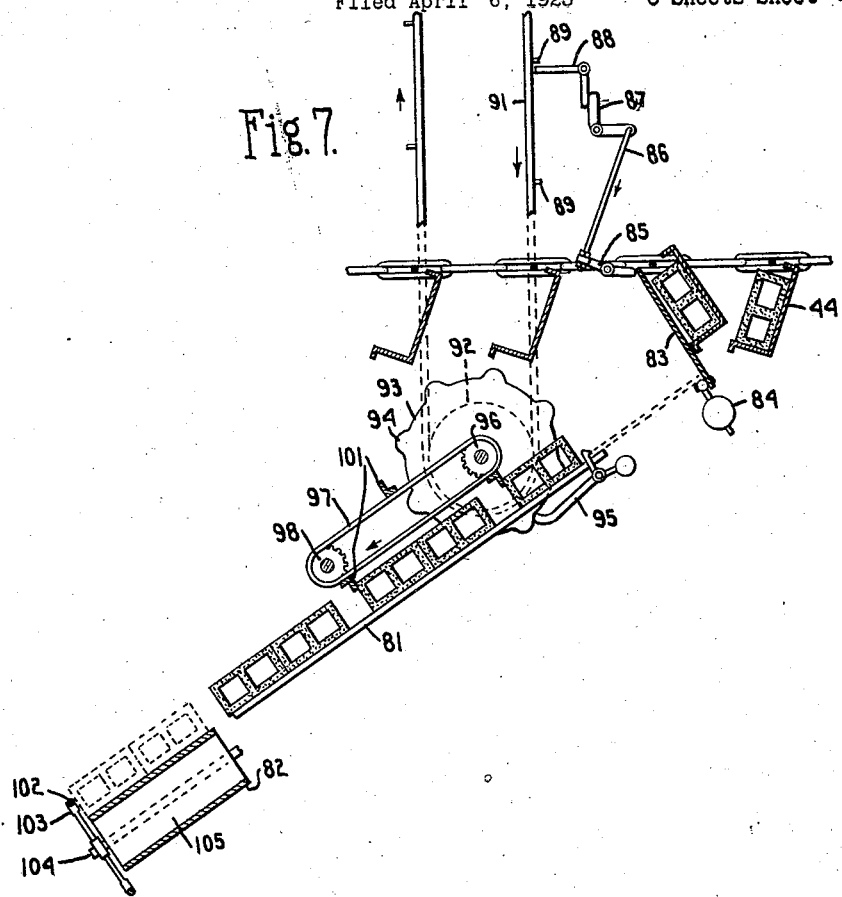
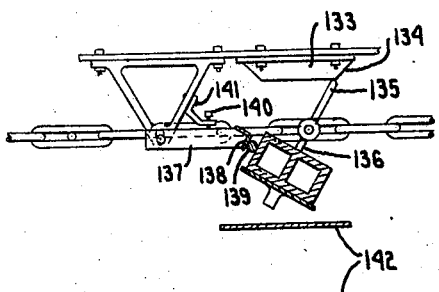
INVENTORS.
Leonard L. Denison
George W. Denison
BY
Ray, Oberlin & Ray
ATTORNEYS.

Feb. 22, 1927.

L. L. DENISON ET AL 1,618,582

APPARATUS FOR PRODUCING BRICK

Filed April 6, 1923    6 Sheets-Sheet 6

INVENTORS.
Leonard L. Denison
George W. Denison
BY
Day, Oberlin + Day
ATTORNEYS.

Patented Feb. 22, 1927.

1,618,582

UNITED STATES PATENT OFFICE.

LEONARD L. DENISON, OF DELAWARE, AND GEORGE W. DENISON, OF BAY VILLAGE, OHIO; SAID GEORGE W. DENISON ASSIGNOR TO SAID LEONARD L. DENISON.

APPARATUS FOR PRODUCING BRICK.

Application filed April 6, 1923. Serial No. 630,229.

This invention relates to a method and apparatus for producing brick. More particularly it comprises a method of carrying the raw material out of which brick is made through a series of forming and structure-modifying steps until the finished article is produced; and it also comprises special apparatus having its parts so interrelated that the manufacture of brick may be carried on as a continuous process with the minimum of labor and a standard quality of product. While in modern brick making plants a large amount of special machinery has been utilized, such apparatus is directed chiefly to the performing of some single operation.

The object of the present invention is to simplify the method and apparatus for producing brick, and particularly to have the several necessary steps employed in brick manufacture so related to one another than an extremely economical as well as a very highly efficient basis of production may be possible. Other objects of the invention will appear in the course of the following description.

It should be noted that while the term "brick" is used in connection with the description of the invention, said term is used broadly and is intended to include clay products manufacture in general. The illustrations show hollow tile blocks, but other forms of units, either solid or hollow, may be substituted therefor, as is readily apparent. To the accomplishment of the foregoing and related ends, said invention, then, consists of the step or steps and means hereinafter fully described and pointed out in the claims.

The annexed drawing and the following description set forth in detail certain steps for carrying out the method and certain mechanism embodying the invention, such disclosed method and means constituting, however, but several of various forms in which the principle of the invention may be used.

In said annexed drawing:—

Figure 3:
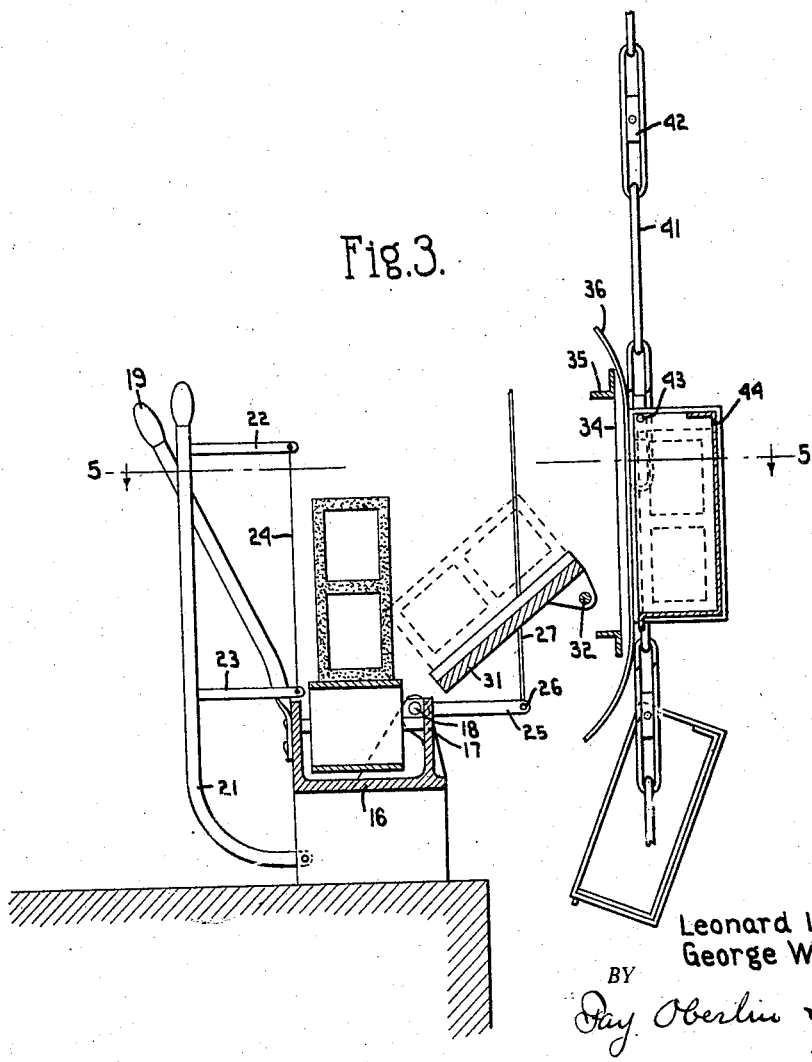
Figure 4:
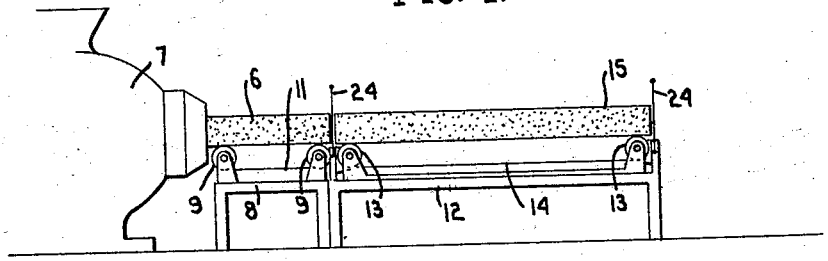
Figure 5:
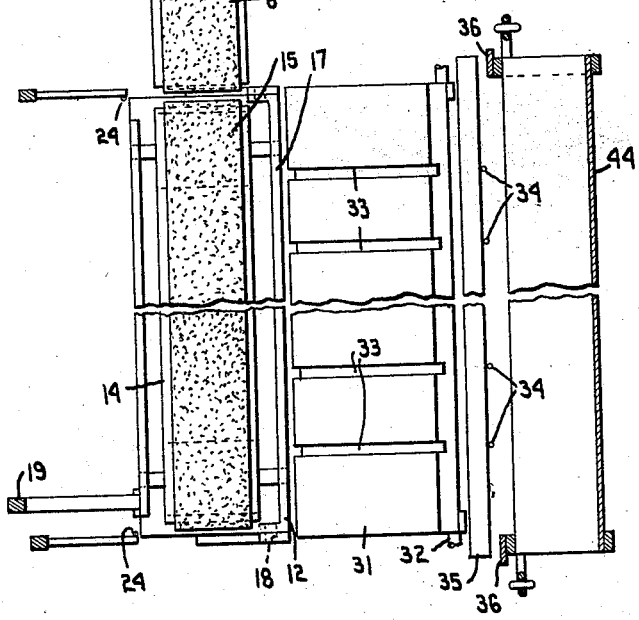
Figure 6:
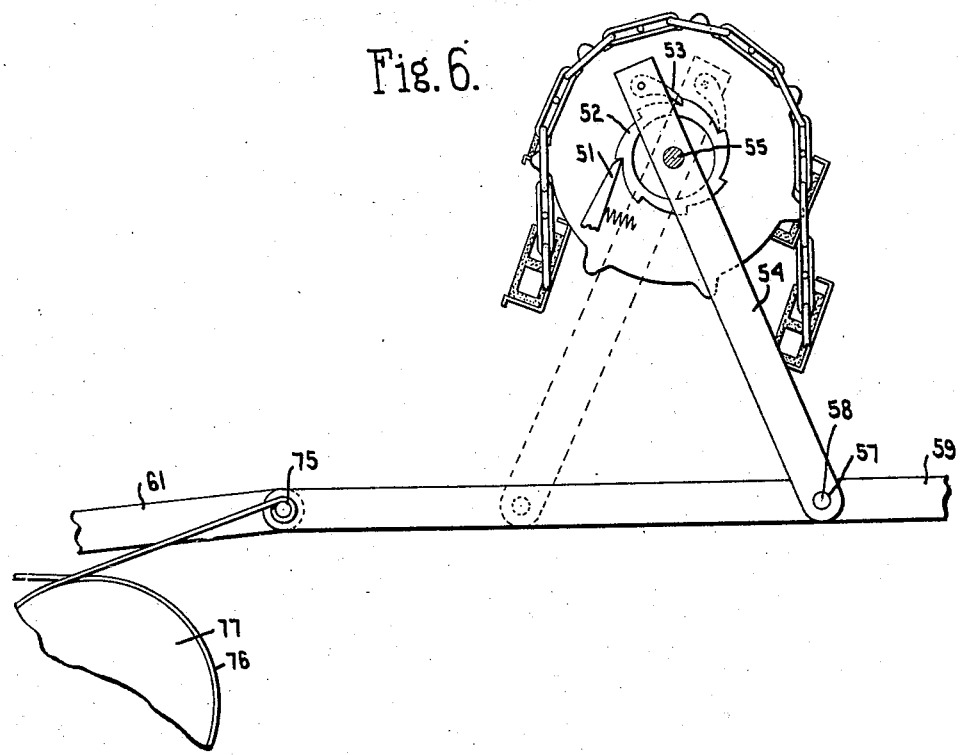
Figure 8:
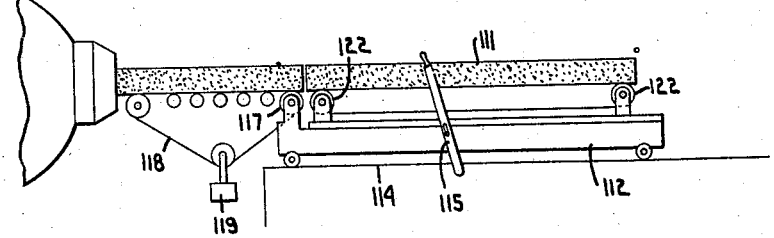
Figure 9:
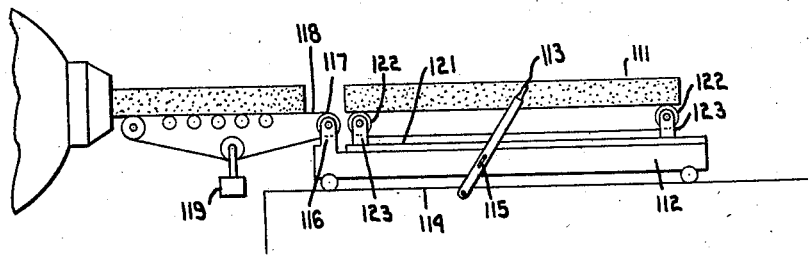
Figure 10:
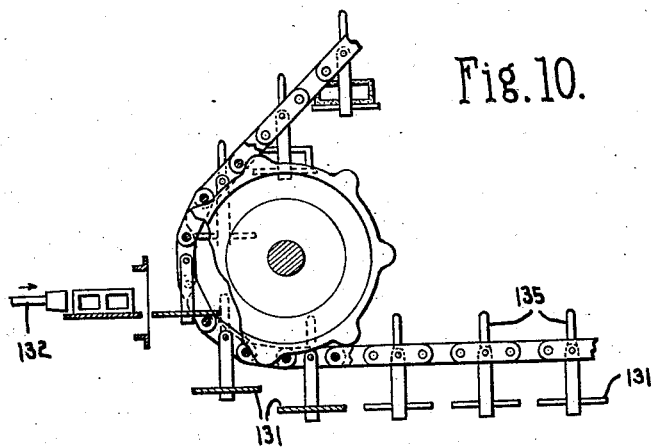

Fig. 1 is an end elevation of the brick plant showing the relative position of the kilns and drier apparatus; Fig. 2 is a longitudinal sectional view showing the drier apparatus and the method of loading and moving the same; Fig. 3 is an enlarged detail view showing the loading apparatus for the drier conveyor; Fig. 4 is a side elevation showing a portion of the clay column extruding apparatus and its associated mechanism; Fig. 5 is the top plan view taken along the line 5—5 shown in Fig. 3, looking in the direction of the arrows; Fig. 6 is an enlarged detail view showing a part of the operating means for the conveyor of the drier apparatus; Fig. 7 is a longitudinal sectional view showing the means for unloading the brick units from the conveyor of the drier apparatus; Fig. 8 is a view similar to Fig. 4, showing a modified form of apparatus for handling the clay column; Fig. 9 is a view similar to Fig. 8, showing the clay column handling apparatus in a different operative position; Fig. 10 is an enlarged detail view of a portion of a modified type of conveyor for the drier apparatus, with a plunger type of apparatus for loading the same; and Fig. 11 is a sectional view in enlarged detail, showing the apparatus for unloading a conveyor of the type shown in Fig. 10.

As is clearly shown in Figs. 1 and 2 of the drawing, the brick plant comprises a building 1, provided with a roof 2, inclined to either side, at an angle of substantially 40° to the horizontal, and extending to a point closely adjacent the ground. Centrally of the building and extending longitudinally thereof beneath the ridge of the roof a drier apparatus 3, of the belt conveyor type, is provided. Upon each side of the drier, a multichambered kiln 4 is provided and auxiliary conveyor mechanism 5 is provided for transferring the product from the main conveyor into the respective chambers of the kilns. A second set of conveyors may be used to convey the brick after the completion of the firing operation from said chambers to a point at the rear where the finished product is delivered.

As is disclosed in Figs. 4 and 5, the clay column 6, from which the brick, hollow tile and other clay products is to be formed, is extruded from a press or extruding apparatus 7. Any suitable clay column forming apparatus may be used and if desired, a steam press may be employed.

The clay column, as it emerges from the forming apparatus, is received upon a platform or table 8 provided with rollers 9 over which an endless belt 11 is engaged. Adjacent to the table 8, an extension table 12 is provided, having similar rollers 13, with a belt 14 of a length suitable to receive a section of the clay column 15 corresponding to the width of the receptacles or trays of the conveyor of the drier mechanism. The table 12 comprises a lower stationary portion or base 16 and a movable section 17 provided with pivots 18 connected with the base, about which it may be swung by means of a hand lever 19, secured to the side of the movable section opposite said pivots. Any other suitable mechanism may be used for swinging the movable portion of the table and such mechanism may be synchronized so as to work automatically with the other portions of the apparatus.

Adjacent the base of the stationary portion 16 of the table, a pair of levers 21 are pivoted, said levers being provided with extension arms 22, 23, which have suspended between their outer ends wires 24 adapted to be forced through the clay column after the usual manner, in order to sever a section of the same from the main body of the column. The section so divided from the clay column, preferably, should be of a length suitable to fit within one of the receptacles or trays of the drier conveyor, as well as an exact multiple of the units into which it, in turn, is to be subdivided. The movable part 17 of the table 12 is provided with an extension arm 25, having an eye 26 at its outer end in which is engaged a rod 27 extending upwardly to the valve mechanism for a fluid pressure chamber, to be hereinafter described.

At one side of the table 12, and inclined at an angle of approximately 45° thereto, is positioned a rockable platform or transferring table 31 secured at its outer side upon a bar 32 which is provided with means, hereinafter to be described, for swinging said table to a substantially vertical position.

As is clearly shown in Fig. 3, the transferring table is adapted to receive upon its upper surface the section of clay column, previously severed by means of the wires 24, when the upper section of the extension table 12 is rocked upon its pivot. The section of clay column so deposited upon the transferring table 31 is sustained upon a pair of upstanding ribs 33 and upon the turning of the table 31 upon its pivot point to a vertical position, said section of clay column will be forced through a series of wires 34 mounted vertically in a frame 35 in the plane of and surrounding the transferring table 31 when it is carried to a vertical position. Said frame 35 is mounted upon any suitable standards, not shown, adjacent said transferring table. Upon the forward face of the frame 35, two curved trackways 36 are mounted, at the respective outer edges, against which the receptacles or trays of the drier apparatus are adapted to ride. As is shown in Fig. 3, when a tray is carried opposite the frame 35, it contacts with the trackways and is moved into a position to receive the sections of clay column severed by the wires 34 when the table 31 has been swung into vertical position.

As is shown in Figs. 2 and 3 particularly, the conveyor of the drier apparatus comprises a pair of endless chains 41 between the alternate links of which are secured pivot blocks 42, providing bearings for bars 43 upon which are pivotally carried the receptacles or pallets 44 of substantially rectangular form and open at the top. These receptacles extend in parallel relation to each other between the pairs of chains and normally hang in an angular position as suspended from the pivot adjacent their upper inner edge. In passing the curved trackways 36, they are turned to vertical position, as is clearly shown in Fig. 3. The pairs of endless chains 41 are supported upon a series of sprocket wheels which maintain the same in a position to traverse substantially the entire area of the drier apparatus and to carry the trays in a tortuous path therethrough. Thus the chains 41 are engaged over the pairs of sprocket wheels 46 adjacent the platform 31 and extend thence upwardly and over the sprocket wheels 47 and thence downwardly to an idler sprocket wheel 48, and thence upwardly over a second sprocket wheel 49 corresponding to the sprocket wheel 47, and thence over alternate idler and operative sprocket wheels throughout the drier apparatus, the last downward course of said chains carrying them about a sprocket wheel 51 at the lower rearward corner of the drier apparatus, whence they extend forwardly to the sprocket wheel 46, thus completing the circuit of the drier apparatus. The idler sprocket wheels may be vertically adjustable to maintain the proper tension on the chain. A booster chain 50 is connected with the sprocket wheels 46 and 49 and serves to cause the former to rotate in unison with the latter. The use of a booster chain is necessary in starting the apparatus because of the great weight imposed on the forward vertical section of the conveyor. After all the trays between the loading and unloading points of the conveyor are filled, the rearward vertical portion will somewhat overbalance the forward vertical section and will tend to move the system by the force of gravity alone. The booster chain, it will be noted, is carried at its lower end on a sprocket wheel adjustably connected with the main sprocket wheel 46 by means of an adjusting link 40. Through this means the lower horizontal section of the conveyor may be kept under tension, and a predetermined amount of slack maintained in the forward vertical section of the conveyor.

As is clearly shown in Figs. 2 and 6, the sprocket wheels 47, 49, are provided at their hubs with ratchet wheels 52, the teeth of which are adapted to be engaged by means of locking dogs 51 on the frame, and pawls 53 carried by levers 54 journaled upon the axles 55 carrying said sprocket wheels. Said axles are mounted in any suitable manner upon the frame-work 56 of the apparatus. The levers 54 are provided with eyes 57 adjacent their lower ends through which, by means of pins 58, they are pivotally connected with the operating bar 59. The operating bar extends substantially the entire length of the drier chamber and is connected with each lever carried by the upper sprocket wheel axles. The forward end of the bar 59 is connected by means of a link 61 with a stem or rod 62 actuated by any suitable power mechanism, and for purposes of illustration, shown as a fluid pressure cylinder 63, adjacent the upper portion of the drier apparatus.

By means of the fluid pressure cylinder 63, which may be operated by steam, compressed air or in any other desirable manner, the piston and its associated piston rod 62, is reciprocated and through the several levers heretofore described, serves to shift the upper sprocket wheels through an equal arc of rotation.

As is illustrated in Fig. 2, the means for producing the reciprocation of the piston rod comprises the valve 65, which admits fluid to one or the other of the passageways 66, 67, connected with the respective ends of the cylinder 63 and thus admits fluid pressure to one side or the other of the piston head within said cylinder. The valve 65 is adapted to be actuated in one direction by means of the connecting rod 27, heretofore referred to, which extends to an arm 71 connected with the rotating plug of said valve mechanism. A second arm 72 extends downwardly from said rotating plug in a position to be engaged by a lug 73 formed on the upper side of the piston rod 62. The link 61 is provided adjacent its ends with a pair of eyes 74, 75, through which are engaged the ends of a cable 76 extending at the upper end over a pair of pulleys 77, and at the lower end, over a single pulley 78, secured to the shaft 32, which is adapted to rock the table 31. Thus, by means of the cable 76 the transferring table 31 is automatically rotated as the rod 59 is moved back and forth. In this manner the movement of the trays on the conveyor is brought about when the piston head is moved to the rear of the fluid pressure cylinder and the loading of the trays is accomplished when the piston head is moved in the opposite direction. Inasmuch as two chains are used it may be desirable to employ two fluid pressure cylinders and their associated mechanism in place of the single cylinder described, the movement of the parts being synchronized by means of a single valve control. It is also possible to operate the mechanism from a single fluid pressure cylinder by having the axles of the driving sprocket wheels 47, 49, extend across the frame-work of the drier mechanism, and driving the opposite sprocket wheels by having the latter securely mounted upon said respective axles. As shown in Fig. 2, sufficient clearance for the trays above the axles of the sprocket wheels is provided.

After the raw clay units have been carried to the rear of the chamber of the drier, and, in thoroughly dried condition, are moving forwardly upon the lower section of the conveyor, the automatic distribution of said units to the several chambers of the kiln takes place. The preferred means for discharging the contents of the conveyor receptacles is disclosed in Fig. 7, wherein a slide conveyor 81 is used to transfer the dried clay units to one of the conveyor belts 82 running to one of the chambers of the kiln. The slide conveyor is positioned angularly beneath the path of the conveyor trays and has a movable upper section 83 having an adjustable counterbalance 84 which serves to hold it in an upward angular position of approximately 90° inclination to the slope of the slide conveyor. It is latched in said position by means of a pivoted latch bar 85 adapted to be tripped by means of a link 86 and a pair of bell crank levers 87, 88, cooperatively related. One end of the bell crank lever 88 lies in the path of the projecting studs 89 secured at spaced intervals to a belt 91 driven through gearing of the desired ratio, from the driving mechanism for the sprocket wheels and running about a sprocket wheel 92 positioned adjacent the upper end of the fixed portion of the slide conveyor. This sprocket wheel 92 is journaled in the frame-work of said slide conveyor and carries a large disc having a plurality of circumferential cams 94, for actuating a counter-weighted bell-crank latch 95, positioned at the upper edge of the fixed section of the slide conveyor. Adjacent the disc 93 a geared roller 96 is provided, over which is engaged an endless chain or belt 97, supported at its other end upon a geared pulley 98 secured to the frame-work of the slide conveyor. The roller and pulley serve to hold said chain or belt in parallel relation to the slide of said conveyor. The chain or belt carries a plurality of angle bars 101 upon its outer surface, the upstanding edges of which are adapted to ride into the path of the dried clay units as they move down the inclined surface of the conveyor, thus exerting a braking or retarding action upon said clay units preventing them from becoming fractured as they move down said slide-way.

The action of the movable section of the slide-way will be obvious from the description and the showing in Fig. 7 of the drawing. Thus, when said movable section 83 is latched in an upwardly inclined position, it will be directly in the path of the conveyor trays 44. As the conveyor system moves intermittently, one of the trays will be brought into contact with the movable section 83 of the slide conveyor and will be tilted about its point of support in a rearward direction so as to permit the clay units contained in said tray to slide outwardly and downwardly against the surface of said movable section of the slide conveyor. The weight of the clay units, together with the pressure exerted by the tray, is sufficient to overcome the counter-weight 84 when the latch 85 is withdrawn from beneath the upper edge of the movable section of the slide conveyor. When the latch is tripped the movable section of the slide conveyor will rotate to a position in alignment with the fixed section of the slide conveyor and will be latched in such position until released by one of the cams 94 coming into contact with the bell crank latch 95. This releasing of the movable section of the slide conveyor will not be brought about until after the clay units have moved downwardly upon the fixed section of the slide-way, thus relieving the movable section of the slide conveyor of the additional weight and permitting the counter-weight to swing it upwardly to its original position upon the tripping of the bell crank latch. It is obvious that the timing of the operation of the several latches by means of the studs 89 and cams 94 may be arranged to permit the unloading mechanism to take the clay units from each tray on the main conveyor or to handle the contents of every alternate or third receptacle in order that the contents of the conveyor system may be distributed to one or a plurality of the chambers of a kiln according to the particular arrangement and requirements of the plant when in operation.

The lower end of the slide conveyor is positioned adjacent an inclined section of one of the belt conveyors 82 for a chamber of the kiln. The dried clay units, when freed from the restraining effect of the angle bar 101, move downwardly by gravity onto the upper surface of the kiln belt. They are retained in position thereon by means of a cable running over sheave wheels 103 carried by the shaft 104 of certain of the pulleys 105 upon which the auxiliary conveyor belts are supported. While said belts are shown in an inclined position beneath the slide conveyor, it is to be understood that they will normally be turned to horizontal position for the remainder of their path of travel, such inclined position being taken only outside of the kiln adjacent the discharge end of the slide conveyor.

In Figs. 8 and 9 is shown a modified form of table 111 for receiving the clay column as it is extruded from the press. This table comprises a movable section 112 shiftable longitudinally by means of a lever 113 secured at its lower end to the base 114 upon which said table is slidable, and engaged by means of a pin and slot connection 115 with said movable section. An extension 116 on the table carries a pulley 117 over which is engaged the outer end of the belt 118 upon which the clay column is first deposited. On the under side of this belt a weighted idler pulley 119 is swung in order to maintain the belt at all times under heavy tension so that its upper surface will be horizontal, regardless of the position occupied by the shiftable table. Upon the top of the shiftable table a second belt 121 is supported upon rollers 122, mounted in standards 123, at each end of said table, and one end of said second belt is positioned in close proximity to the outer end of the first-mentioned belt in order that the clay column, as it is extruded, may be received thereon. After the operation of the cutting device, of the character heretofore described, which separates the clay column into major units, the table may be shifted longitudinally a sufficient distance to permit the transferring of said major section to the apparatus for dividing the same into the final units and transferring them to the trays of the conveyor, as has been heretofore described. The movable table may then be restored to its position adjacent the belt of the extruding press in time to receive the forward end of the clay column, the formation of which was in no way interrupted by the shifting of the table. This action is clearly shown in Figs. 8 and 9 referred to, the space between the end of the main clay column and the major unit 11 detached therefrom being very small in degree in the showing in Fig. 8 and being of substantial amount in the disclosure in Fig. 9. It is obvious that the amount of separation between the main clay column and the major detached section may be regulated in accordance with the rate of production of the extruding apparatus, and the time required for handling the major section, so that the continuous operation of the apparatus may be carried on at a rate adequate to supply the trays of the conveyor as they are intermittently shifted past the loading point.

In Figs. 10 and 11 are shown a modified form of conveyor as well as specialized loading and unloading apparatus therefor. In this type of conveyor the clay units are carried on swinging trays or pallets 131 and are deposited thereon by means of a plunger 132 actuated in the conventional manner, in synchronism with the intermittent movement of the conveyor. The discharge of the dried units from the conveyor of the modified type is accomplished by means of a cam block 133 secured in a position above the path of movement of the conveyor chain at points adjacent the respective auxiliary conveyor belts passing into the several chambers of the kiln. The cam block has a beveled forward end 134 which is adapted to contact with an extension 135 of the bracket arms 136 which support the trays or pallets 131 of the conveyor. When the chain carries a tray beneath one end of said block, the tray will be gradually inclined until it is turned to an angle inclined rearwardly to the path of motion of the conveyor. The tray will be maintained in said inclined position while passing beneath said block.

Positioned below and forwardly of said block an adjustable abutment 137 is provided for contacting with the load and disengaging it from the pallet as the latter is carried beneath it. The abutment comprises a transverse frame 138 pivoted adjacent its forward edge, and provided with a resilient cushion 139 at its load-contacting edge. The frame may be adjusted vertically by means of an adjusting screw 140 supported upon a suitable bracket 141 on the adjacent frame. The auxiliary conveyor belt 142 is positioned immediately beneath the block 133 and is of substantial width so that the load may be discharged thereon without exact timing of the automatic operations. Immediately after said pallet is cleared, the upper end of the bracket 135 rides from a position beneath said cam block and the pallet resumes is horizontal position.

Other modes of applying the principle of our invention may be employed instead of the one explained, change being made as regards the method and mechanism herein disclosed, provided the steps set forth or the means stated in any of the following claims or the equivalent of such steps or means be employed.

We therefore particularly point out and distinctly claim as our invention:

1. In an apparatus of the character described, the combination of a firing kiln for bricks, a drier positioned adjacent said kiln and extending to a higher elevation than the tops of said kiln, and means for deflecting the heated gases from said kiln through said drier.

2. In an apparatus of the character described, the combination of two parallel multichambered kilns, a drier positioned between said kilns and extending to a higher elevation than the tops of said kilns, and means for deflecting the heated gases from said kilns through said drier.

3. In an apparatus of the character described, the combination with means for supplying clay units, of a conveyor mechanism movable intermittently through a drying chamber, a brick kiln positioned closely adjacent said conveyor, means for loading said units upon said conveyor at a point adjacent the end of said kiln, means for deflecting the heated gases from said kiln through said conveyor, individual conveyor belts positioned immediately beneath said main conveyor for supplying clay units to the firing chambers of said kiln, and means for automatically transferring units from said main conveyor to said auxiliary conveyors, for carrying said material into said kilns.

4. In an apparatus of the character described, the combination with a clay column extruding mechanism of an endless conveyor, means for subdividing said clay column and depositing the same upon said conveyor, a brick kiln adjacent said conveyor, a plurality of auxiliary conveyors for transferring clay units into said kiln, and selective means for removing predetermined quantities of the load carried by said conveyor and depositing the same upon any selected auxiliary conveyor.

5. In an apparatus of the character described, the combination with a clay column extruding mechanism, of an endless conveyor, means for subdividing said clay column and depositing the same upon said conveyor, said endless conveyor comprising a pair of chains with elongated links, bearing blocks in alternate links, a plurality of trays, laterally projecting axle shafts associated with said trays and engaged within the bearings in said links, means for moving said conveyor intermittently, means for loading said trays during an interval between the periods of movement of said chains, and means for turning said trays to an angular position during said loading operations.

6. In an apparatus of the character described, the combination with a clay column extruding mechanism, of an endless conveyor, means for subdividing said clay column and depositing the same upon said conveyor, said endless conveyor comprising a pair of chains with elongated links, bearing blocks in alternate links, a plurality of trays, laterally projecting axle shafts associated with said trays and engaged within the bearings in said links, means for moving said conveyor intermittently, means for unloading said trays during an interval between the periods of movement of said chains, and means for turning said trays to an angular position during said unloading operation.

7. In an apparatus of the character described, the combination with a clay column extruding mechanism, of a receiving table over which said column is moved at constant speed as produced, an extension table adjacent said receiving table adapted to receive a detached section of said column, means for shifting said extension table longitudinally of the path of said clay column, and means for moving said extension table transversely of the path of said clay column.

8. In an apparatus of the character described, the combination with a clay column extruding mechanism, of a receiving member comprising a belt, rollers for supporting said belt, one of said rollers being mounted adjacent the discharge orifice of said extruding apparatus, an extension table, one of the rollers of said receiving belt being mounted at one end thereof, means for shifting said extension table longitudinally of the path of motion of said clay column, a movable section of said extension table, a belt mounted thereon, rollers at the ends of said movable section of said table supporting said belt, and means for displacing the movable section of said table transversely of the path of movement of said clay column.

9. In an apparatus of the character described, the combination with a clay column extruding mechanism, of a receiving member comprising a belt, rollers for supporting said belt, one of said rollers being mounted adjacent the discharge orifice of said extruding apparatus, a counter-weight for maintaining said belt under tension, an extension table, one of the rollers of said receiving belt being mounted at one end thereof, means for shifting said extension table longitudinally of the path of motion of said clay column, a movable section of said extension table, a belt mounted thereon, rollers at the ends of said movable section of said table supporting said belt, the forward roller being closely adjacent the movable roller of said receiving belt whereby said receiving and transferring belts are maintained in alignment and closely juxtapositioned, and means for displacing the movable section of said table transversely of the path of movement of said clay column.

10. In an apparatus of the character described, the combination with a clay column extruding device, means for severing a section from said clay column, a transferring table for receiving said section, means for moving said transferring table transversely, and means for subdividing said severed section of clay column upon transverse movement of said transferring table.

11. In an apparatus of the character described, the combination with a clay column extruding device, means for severing a section from said clay column, a transferring table for receiving said section, means for moving said transferring table transversely, and cutting wires adjacent said transferring table for subdividing said section of clay column into final brick units upon the transverse movement of said transferring table.

12. In an apparatus of the character described, the combination with a clay column extruding mechanism of means for receiving said clay column, an extension table adjacent said receiving means, means for severing said clay column at each end of said extension table, means for shifting said extension table longitudinally of said clay column, a transferring table, means for shifting said extension table transversely of said clay column to deposit a section of clay column upon said transferring table, means for moving said transferring table transversely, means for subdividing said severed section of clay column upon the transverse movement of said transferring table, and means for receiving the subdivided units of said clay column and moving them relatively to said transferring table.

13. In an apparatus of the character described, a pair of endless chains movably supported in parallel relation to each other, a plurality of trays supported at uniform intervals between said chains, means for intermittently shifting said chains, means for subdividing a clay column into brick units and depositing them in said trays as a single operation between the intervals of motion of said chains, means for unloading said clay products from said trays between the periods of motion of said chains, and means associated with said loading means for controlling the shifting of said chains.

14. In an apparatus of the character described, an endless conveyor having a plurality of trays supported at uniform intervals thereon, and means for subdividing a section of clay column into brick units and depositing them in said trays as a single operation.

15. In an apparatus of the character described, an endless conveyor having a plurality of trays supported at uniform intervals thereon, means for subdividing a section of clay column into brick units and depositing them in said trays as a single operation, and means for automatically removing said units from said trays.

16. In an apparatus of the character described, an endless conveyor having a plurality of trays supported at uniform intervals thereon, means for subdividing a clay column into brick units and depositing them in said trays as a single operation, means for tilting said loaded trays, automatic means for removing the contents of said trays comprising a movable slideway, a counterbalance on said slideway, means for latching said slideway in load engaging and load discharging position, and automatic means for tripping said latches.

Signed by us, this 20th day of March, 1923, and this 29th day of March, 1923, respectively.

LEONARD L. DENISON.
GEORGE W. DENISON.